May 5, 1953 K. W. MILLER 2,637,205
MAGNETIC PICKUP UNIT AND METHOD OF MAKING SAME
Filed July 11, 1947 2 SHEETS—SHEET 1
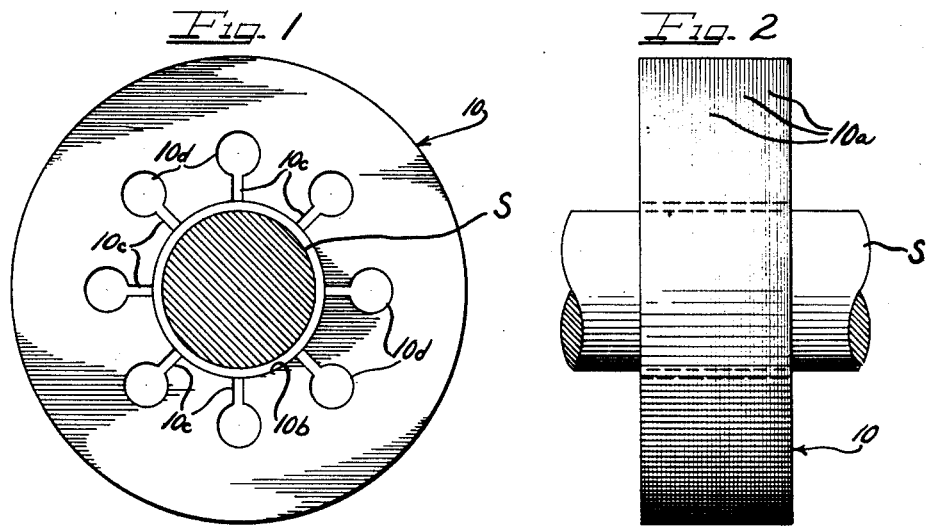
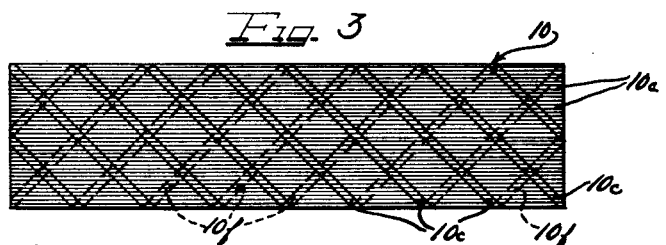
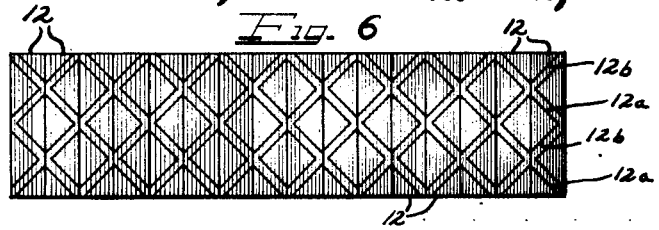
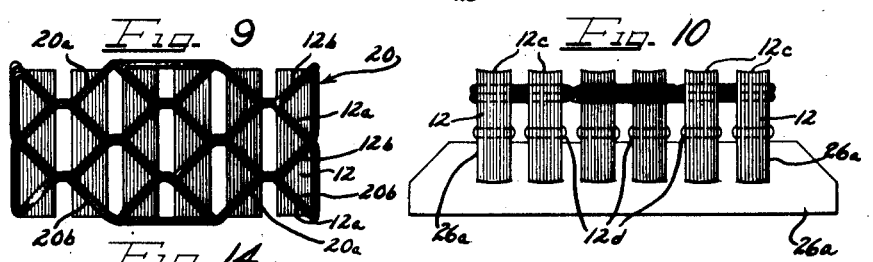
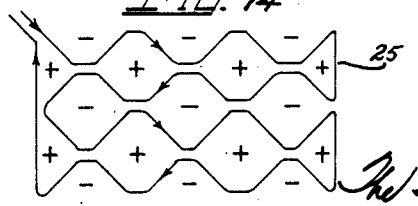
Inventor
KENNETH W. MILLER
by
Attys.

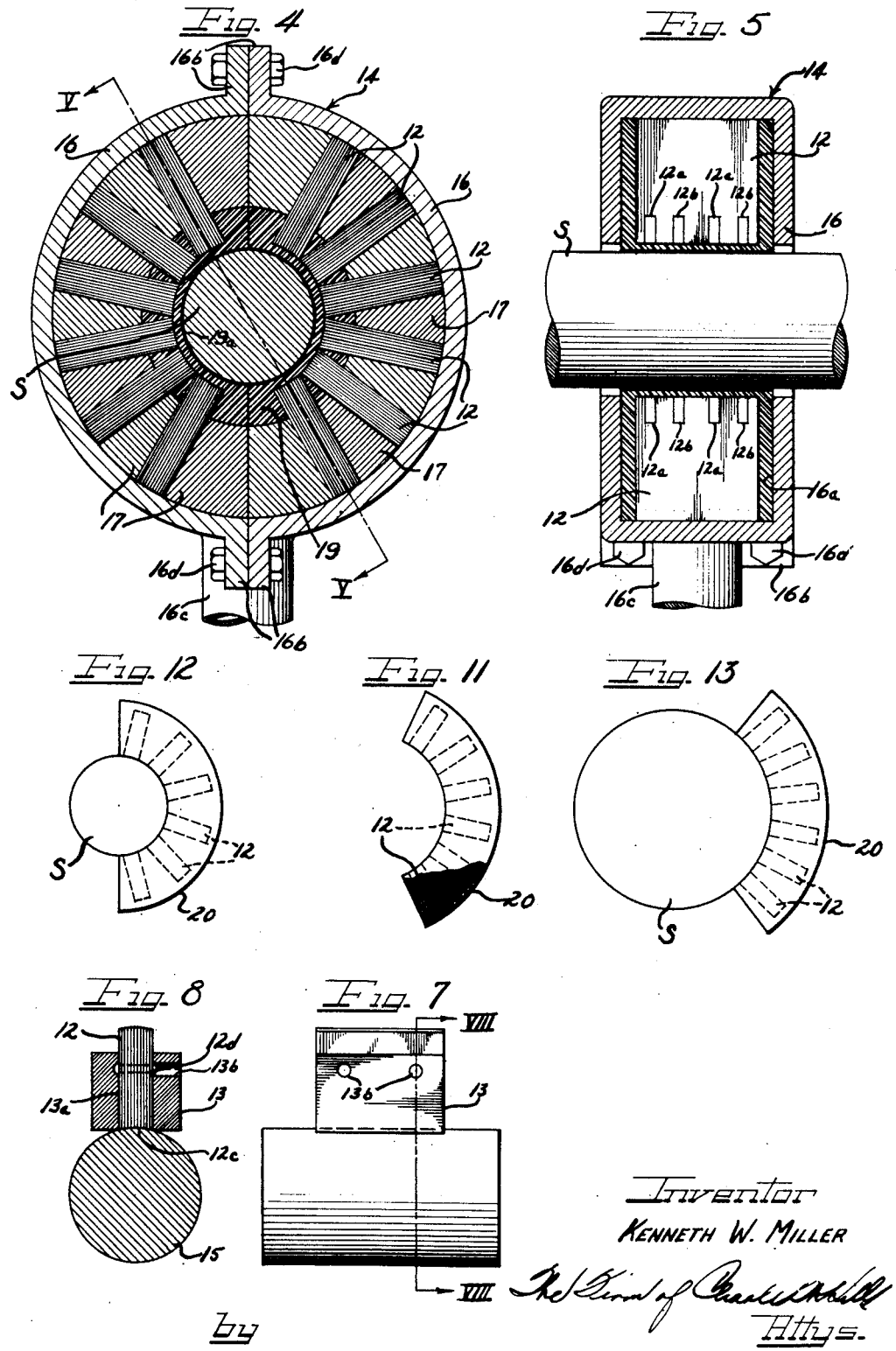

Patented May 5, 1953

2,637,205

UNITED STATES PATENT OFFICE 2,637,205

MAGNETIC PICKUP UNIT AND METHOD OF MAKING SAME

Kenneth W. Miller, Chicago, Ill., assignor, by mesne assignments, to C. Morgan Rifenbergh, Plymouth, Mich.

Application July 11, 1947, Serial No. 760,394

23 Claims. (Cl. 73—136)

This invention relates to an improved magnetic pickup unit and to a method of fabricating and assembling such unit. While not limited thereto, a pickup unit embodying this invention finds particular application in magnetic torquemeter apparatus of the type which has been recently developed for measuring instantaneous and/or average torque conditions in a rotating shaft, such, for example, as the propeller shaft of an aircraft engine.

For a complete discussion of the theoretical principles of operation underlying this type of torquemeter, reference should be made to the pending applications of Clare M. Rifenbergh, Serial No. 515,277, filed December 22, 1943, now Patent 2,557,393, issued June 19, 1951, and Serial No. 760,299 filed of even date herewith, now Patent 2,553,833 issued May 22, 1951, all of said Rifenbergh applications being assigned to the assignee of this application.

In accordance with the disclosures of the aforementioned Rifenbergh applications, an extremely satisfactory and accurate indication of dynamic torque conditions in a rotating shaft, or, more generally, an indication of the stress or strain conditions existing in a member subjected to a stress or strain, may be effectuated by the employment of a magnetic pickup unit capable of forcing flux into the surface of the stressed member in such manner that the flux is directionally oriented with respect to tensile and compressive directional components of the stress or strain in such member. Such apparatus generally embodies one or more pickup coils which is supplied with an alternating, intermittent or periodic current to produce the directionally oriented flux.

By proper design of the circuit constants, such torquemeters may be satisfactorily utilized over a wide range of frequencies of the periodic intermittent or alternating currents supplied to the pickup coil. In many applications it has now been found desirable to employ frequencies within the audio range, i. e., frequencies ranging from 60 cycles to around 20,000 cycles per second. When employing such frequencies, the size of the pickup coils may be substantially reduced by utilizing a magnetic structure in cooperation with the pickup coil to produce a higher intensity of flux flow through the surface of the stress member being tested. As is commonly known, such magnetic structure should preferably be built up from thin laminations of magnetic material in order to reduce the undesirable effects of eddy current and hysteresis loss in the magnetic structure.

In order to effect the require orientation of the flux produced by the pickup coil or coils with respect to the tensile or compressive directional components of the stress in the member to be tested, it is necessary to either orient the pickup coils in the magnetic laminations to produce such oriented flux, or to provide an oriented air gap between the pole faces of magnetic structure and the member to be tested and then employ a coil or coils to produce the desired flux flow through and across the oriented air gap. In either event, the mounting of the coils in the magnetic structure, according to known arrangements heretofore employed in dynamo-electric machines and the like, results in a magnetic structure in which the pole faces have an extremely complex configuration which cannot be produced by economical production methods, such as stamping, but which must be laboriously machined. Therefore, in order to effect the transition of the torquemeter development from a laboratory apparatus to a practical production-designed device adapted for economical manufacture and use, a complete departure from conventional magnetic circuit designs for pickup coils was a matter of utmost necessity.

Accordingly, it is an object of this invention to provide an improved magnetic pickup unit and a method of fabricating and assembling such unit. While not limited thereto, it is a principal object of this invention to provide an improved magnetic pickup unit for use in torquemeters or analogous form of stress or strain measuring apparatuses.

A further object of this invention is to provide a magnetic pickup unit for measuring torque in rotating shafts characterized by the employment of packs of laminations disposed in spoke-like relationship with respect to the shaft to be tested.

Still another object of this invention is to provide a magnetic pickup unit for torquemeters characterized by the formation of the unit into two semi-annular segments which may be assembled around the shaft to be tested without requiring removal of the shaft from its bearings or modifications of the shaft in any manner.

A further object of this invention is to provide a torquemeter pickup unit for rotating shafts which is adaptable for measurement use on shafts varying in diameter over a substantial range.

Still another object of this invention is to provide a laminated magnetic pickup unit for producing an oriented flux flow through the surface of a rotary shaft-like member characterized by the mounting of the laminations in generally spoke-like relationship with respect to the shaft-like members and with the plane of each of the laminations disposed substantially parallel to the axis of the shaft-like member.

A particular object of this invention is to provide an economically manufacturable magnetic pickup unit characterized by the employment of a plurality of identical packs of identical laminations which may be concurrently subjected to high speed milling operations for cutting the required relatively complex pole face configuration of such laminations, and, further, to which form windings may be applied prior to the assemblage of the packs of laminations into a spoke-like configuration within a generally annular supporting frame.

The specific nature of the invention as well as other objects and advantages thereof will become apparent to those skilled in the art from the following detailed description of the annexed sheets of drawings which, by way of preferred example only, illustrate two specific embodiments of the invention.

On the drawings:

Figures 1 and 2 are respectively side and front elevational views of a magnetic pickup unit for a torque-meter of the type heretofore employed, shown in association with a shaft;

Figure 3 is a developed view of the pole faces of the laminated structure of the magnetic pickup unit of Figures 1 and 2;

Figure 4 is a sectional view taken on a plane perpendicular to the axis of a magnetic pickup unit embodying this invention, showing the unit in assembled relationship with respect to a shaft to be tested;

Figure 5 is a sectional view taken on the plane V—V of Figure 4;

Figure 6 is a developed view of the lamination packs for a magnetic pickup unit embodying this invention in an initial stage of their manufacture;

Figure 7 is a side elevational view illustrating the manner in which the packs of laminations are provided with an arcuate pole face contour without a cutting operation;

Figure 8 is a sectional view taken on the plane VIII—VIII of Figure 7;

Figures 9 and 10 are respectively top and side elevational views of the packs of laminations in a later stage of manufacture, showing the manner in which the form windings are assembled thereto;

Figure 11 is an elevational view of a modification of this invention wherein the packs of laminations are embodied in a deformable frame;

Figures 12 and 13 are elevational views illustrating the adaptation of the modification of Figure 11 to a small or large diameter shafts; and Figure 14 is a schematic developed wiring diagram showing the preferred arrangement of a biasing winding in the magnetic unit.

As shown on the drawings:

To more clearly illustrate the problem solved by this invention, there has been shown in Figures 1 through 3 a form of magnetic structure for the magnetic pickup unit of a torquemeter which has been heretofore employed. Such pickup unit comprises a magnetic structure 10 formed by stacking of a plurality of annular, disk-like laminations 10a. For reasons which are clearly set forth in the above referred to Rifenbergh applications, the inner face 10b of the stack of laminations is contoured to provide a plurality of helically extending minimum air gap regions. Such contouring may be conveniently accomplished by the cutting of slots 10c in the laminations. The slots 10c may respectively communicate with enlarged apertures 10d which may be employed to receive the turns of the pickup coil or winding (not shown) for the magnetic pickup unit. As described in the above referred to Rifenbergh applications, each of the laminations 10a may be originally punched in an identical manner to provide a plurality of apertures 10d and slots 10c, and when the stack of laminations is assembled, each of the individual laminations is skewed with respect to the adjacent laminations so that the slots 10c take on a generally helical configuration as indicated by the solid diagonal lines shown in the developed view of Figure 3.

The aforesaid construction is reasonably satisfactory when the torquemeter apparatus employs two separate magnetic pickup units which are axially displaced on the shaft. Then a single pickup coil may be wound in the helical slots 10d after the stack 10 is formed without too much difficulty. However, in the event that it is desired to employ a single magnetic pickup unit incorporating axially superposed coils, then it is necessary that the magnetic structure 10 be provided with an additional set of slots 10f indicated by the dotted lines in the developed view of Figure 3. It is immediately apparent that the necessity for a second set of helical slots 10f prevents the fabrication of the magnetic structure by assemblage of identical laminations, for it is not possible to skew identical laminations to provide the double slot configuration. Hence, the only remaining method of producing the double helically slotted configurations is to machine such slots in the inner face of the assembled stack of laminations. Those skilled in the art will recognize the difficulty of this operation as well as the great expense thereof.

One further point should be noted about the magnetic structure of Figures 1 through 3. Even when two sets of helical slots are incorporated in the pole faces of such magnetic structure, each of the slots intersects the plane of the laminations at an angle of substantially 45°.

Turning now to Figures 4 and 5, which illustrate a magnetic pickup unit embodying this invention, it will be seen that a plurality of identical packs 12 of identical laminations are employed, and such packs are disposed in spoke-like relationship with respect to an annular frame member 14. Now assuming that a double set of helical slots 12a and 12b are produced in any desired manner in the inner faces of the packs of laminations 12, then the resulting helical slots will bear an identical relationship with respect to the plane of each of the laminations as existed in the construction of Figures 1 through 3 which has heretofore been employed. That is, each of the helical slots will intersect the plane of the laminations at an angle of substantially 45°. Therefore, so far as the flux passing across such laminations and emanating from the pole faces is concerned, the spoke-like construction of the lamination packs of this invention will yield the same result as the stack of annular disk laminations employed in previously known constructions. In other words, in a pickup unit embodying this invention, the laminations are disposed in a plurality of packs, all of the packs preferably being identical, and the packs are then disposed in spoke-like relationship with respect to a shaft to be tested. In such position, the plane of each of the laminations of the pack is substantially parallel to the axis of the shaft being tested. In the previously utilized constructions, the plane of each of the laminations was perpendicular to the axis of the shaft to be tested.

The utilization of the spoke-like arrangement of laminations greatly simplifies the manufacture and assembly of the magnetic pickup unit. The first step of the manufacturing process is of course the assemblage of a large stack of identical laminations. For example, the stack may be formed in the manner illustrated in Figure 6 with the face thereof that is to eventually be the pole face of the magnetic pickup unit exposed. The exposed face of the large stack of laminations is then machined to produce angularly directed slots therein. If the pickup unit is to employ a pair of axially superposed coils, then the two sets of slots 12a and 12b are machined into the exposed face of the stack. Such slots are angularly disposed relative to each other, and while not limited thereto are preferably disposed perpendicular to each other. It should be noted that this machining operation is quite simple inasmuch as a substantially plane surface is presented by the stack of laminations for operation by the milling machine. Hence, the cutting of the slots may be rapidly and economically accomplished by standard milling technique, and certainly may be much more economically accomplished than the milling of the helical slots in the annular inner face of the stack of annular disk laminations employed in the construction of Figures 1 through 3.

After the slots are cut, the laminations are separated into groups of identical packs, as indicated by the heavy division lines in Figure 6. Each of the packs is then subjected to a suitable operation to provide a generally arcuate concave contour to the face 12c of each pack of laminations which is to be employed as the pole face. While such contouring may obviously be accomplished by stamping or milling operations on the individual packs, this invention preferably contemplates the production of the concave contour by displacement of each of the laminations of the pack with respect to the other laminations. Thus, as clearly shown in Figures 7 and 8, one or more of the packs of laminations 12 may be inserted into an opening 13a provided in a work holder block 13. Such block is positioned in overlying relationship to a shaft member or mandrel 15 which has a diameter corresponding to that of the shaft to be tested, or, if a range of shaft sizes is to be tested, corresponding to the median diameter of the range of shaft sizes. The lamination pack 12 is then tapped against the periphery of shaft member 15 so that the end face 12c thereof assumes a generally arcuate contour corresponding to such periphery. While thus disposed, the laminations of the pack 12 are riveted together by one or more rivets 12d which pass through a suitable enlarged hole provided in each of the laminations. Rivets 12d may be conveniently upset while the laminations are supported within the work holder block 13 by the provision of a transverse hole 13b in such work holder which aligns with the holes in the lamination pack and permits a suitable upsetting tool to be inserted therein to accomplish the riveting.

As has been brought out in the above referred to Rifenbergh applications, it is not necessary that the pickup coil of the magnetic pickup unit completely surround the periphery of the shafts to be tested. It therefore follows that it is not necessary to provide a magnetic structure completely surrounding such periphery. However, for the purposes of eliminating the effects of bending stresses in the shaft, it is desirable to subject the shaft being tested to oriented fluxes at diametrically opposed points of the shaft surface. Therefore, after the individual laminated packs 12 have been assembled and riveted as described, one or more packs as required to cover a portion of one side of a shaft to be tested are inserted in spaced slots 26a in a second work holder 26 and supported therein in spaced, aligned relationship with the concavely contoured pole faces 12c of the packs exposed, as shown in Figures 9 and 10. When thus positioned, it is a simple matter to apply a winding 20 to the lamination packs 12. It should be noted that the pole faces 12c of the lamination packs are at this point properly contoured to provide an oriented flux flow when the packs are disposed in spoke-like relationship with respect to a shaft to be tested. Therefore, the windings to be applied to the packs need not necessarily be oriented with respect to the tensile and/or compressive directional components of the torsional stress in the shaft. However, as a matter of convenience, the winding 20 is preferably inserted in the slots 12a and 12b of the laminated packs.

Since two sets of angularly disposed, axially superposed slots are to be provided in the particular magnetic pickup unit illustrated in the drawings, the winding 20 then comprises two sets of coils 20a and 20b respectively. While such coils may be wound directly into the slots 12a and 12b of the lamination packs 12, they may be more conveniently and economically preformed by automatic machinery independently of the lamination packs and then assembled therein, and this latter procedure is preferred.

Each of the windings 20a and 20b is preferably formed as a series of coils of generally trapezoidal shape, the parallel sides of such coils bearing the same angle with respect to the non-parallel sides as the slots of the laminations bear with respect to the edges of the laminations. Prior to assembly in the slots 12a and 12b, respectively, of the lamination packs, the windings 20a and 20b are interlaced so that equal portions of one winding will be disposed above and below portions of the other winding. The interlaced windings are then assembled into the slots of the packs of laminations 12 in the manner clearly shown in Figures 9 and 10. The interlacing of the individual windings insures a balanced position of the two sets of coils with respect to the surface of a shaft to be tested and hence permits absolute balance of such windings when connected in the bridge circuit which is commonly utilized in connection with torquemeter apparatus.

The set of wound lamination packs is then removed from the work holder 26 and deformed into a generally annular segment configuration with the individual lamination packs 12 disposed in spoke-like relationship therein. Such an arrangement is illustrated in Figures 4 and 5. It should be particularly noted that any one set of wound packs may be deformed to accommodate a large range of shaft sizes. In the particular example illustrated, the adjacent edges of the concave pole face portion 12c of the packs are touching and hence this particular arrangement represents the smallest diameter unit that may be obtained for the particular size of the lamination packs.

By circumferentially spacing the lamination packs 12 to a greater degree, a substantially larger shaft may be accommodated, at least up to the point where the deviation of the concave contour 12c of the pole faces of the stack from the shaft circumference becomes sufficiently large to produce irregularities in the flux orientation.

The reason that the spoke-like configuration of the lamination packs may be successfully employed, and, in addition, why the lamination packs may be circumferentially separated without influencing the accuracy of the results obtained therewith, is based upon the fact that the critical air gap (or low permeability gap) in the entire magnetic structure is that defined by the helical slots 12a and 12b provided in the pole faces. Relatively little flux flows across the planes of the laminations or across the space between the various packs of laminations. Since an iron alloy will be generally used for the lamination material, such alloys may be readily chosen to achieve permeabilities of 500 to 1000. Since the circumferential space between the individual packs has a permeability of unity when either air or a non-magnetic filler material is employed, it is obvious that the packs 12 may be quite widely spaced without the leakage reactance of the coil sides between the spaced packs becoming an appreciable fraction of the active or useful working impedance of the coils represented by the helical slot portions in the pack. Therefore, the spoke-like packs 12 need not touch each other nor make a closed cylindrical inside surface adjacent to the shaft as is shown in Figure 4 for the minimum shaft diameter condition. Instead, the laminated packs may be the same standard size for shafts of a wide range of diameters and merely more widely spaced apart around each semi-circumference. As previously mentioned, for large shafts it is not necessary to cover a major fraction of the entire circumference to cancel out, from torque indications, any bending moment in the shaft. But it is permissible to have two clusters of equally spaced packs diametrically opposite and spaced symmetrically with respect to the shaft axis.

According to one modification of this invention, illustrated in Figures 4 and 5, symmetrical clusters of wound lamination packs 12 are assembled into each of two semi-annular elements forming the frame 14. Each frame element 16 is of generally U-shaped cross section, as shown in Figure 5, so as to define a semi-torous-like recess 16a within which the cluster of wound packs 12 may be assembled. The packs 12 may be secured within each of the semi-annular frame segments 16 in any conventional manner, but is preferred that they be fixedly positioned therein by inserting spacers 17 between each of the individual packs. Rigid assemblage of the lamination packs 12, the windings 20, and the spacer 17 may then be obtained by filling the remaining space in each of the semi-frame units 16 by a suitable matrix. For example, the whole assembly may be vacuum-pressure impregnated with a suitable plastic and then oven baked. The plastic material would then fill the open spaces in the assembly as indicated at 19.

Each of the semi-annular frame elements 16 is provided with a mating flange portion 16b by which the two frame elements may be assembled into a complete annular unit by bolts 16d. Each half-frame element may include a semi-cylindrical, radial projection 16c which, when assembled, defines a conduit for the connecting wires for effecting electrical connection to the winding 20.

The matrix 19 of insulating material is preferably incorporated in the assembly by securing the two half portions of the unit in assembly around a shaft-like mandrel, which mandrel corresponds approximately to the size of the shafts to be tested with the unit. The whole assembly is then vacuum pressure impregnated with a suitable plastic and oven baked. The mandrel is then removed, leaving a solid bonded structure giving perfect mechanical and insulating protection to the windings, the laminations, etc., and being impervious to moisture and oil. Furthermore, by proper selection of the matrix material so as to employ a material having good bearing properties, the cylindrical bore 19a defined by such material when the mandrel is removed may be employed as a bearing to support the torquemeter unit upon the shafts to be tested and thus eliminate the necessity of providing anti-friction supports for the unit, which have heretofore been required.

Thus the magnetic pickup unit embodying this invention is readily divisible into two or more parts for easy application to or removal from any cylindrical shaft, from the side, top or bottom thereof, and regardless of flanges or other obstructions on the shaft.

Referring now to Figures 11 through 13, there is disclosed a modification of this invention wherein the same desirable feature of employing identical packs of laminations disposed in spoke-like relationship is again employed. The lamination packs employed in this modification are formed in identical manner as heretofore described and provided with suitable windings (not shown). The wound packs of laminations are then secured to a semi-annular frame segment 20 of deformable construction. For example, the packs may be laminated into a segment of deformable material. Sponge or foam rubber would constitute a very satisfactory material, and many others will suggest themselves to those skilled in the art. When a range or shaft size is to be tested by a single magnetic pickup unit, the unit is then formed with an inner pole face diameter substantially equal to the mean diameter of the range of shaft sizes. Then by deforming the frame or the frame material, the same unit may be employed for either smaller or larger shafts within the range as respectively illustrated in Figures 12 and 13.

In the modification of Figures 11 through 13, a further advantage is provided in that the rubber-like material within which the laminated packs are embedded may be conveniently molded to provide a thin wearing surface film over the pole faces of the lamination packs. Such film could then be impregnated with graphite and hence provide a very satisfactory bearing surface for supporting the pickup unit directly on the shaft without the necessity of providing anti-friction bearings.

By the practice of this invention, the laminations forming the packs 12 may be initially identical strips of sheet material. This provides a substantial contribution to the economies of production achieved by the methods of this invention. Furthermore, the possibility of using a fixed number of standard, identically shaped lamination packs for many shaft sizes is not only a mechanical and manufacturing advantage, but also a great electrical one. As brought out in detail in the aforementioned Rifenbergh applications, the two coils of the winding 20 are generally connected into opposed arms of a bridge circuit for providing an indication of the stress conditions within the member being tested. It has been heretofore mentioned that with laminations of relatively high permeability the leakage flux between the packs will not greatly change the total impedance of the windings with pack spacing. Therefore, magnetic pickup units constructed with the identical number and size of laminated packs will, for a wide variety of shaft sizes, have working impedances so nearly equal that one single electric oscillator and electronic bridge circuit will be "impedance matched" for all shaft sizes of pickup units. With very minor electrical adjustment, the same electronic circuit can be switched to any shaft size pickup unit at will.

While the magnetic packs have heretofore been referred to as being formed from laminations, the identical size and shape of such packs used for many sizes of shafts to be tested will readily permit such packs to be fabricated in large quantities by pressing or molding of powdered iron. In such case, the slots in the packs could then be enlarged at the bottom similar to the apertures 10d in the previously utilized construction shown in Figures 1 through 3. While such enlargement of the bottoms of the slots can be accomplished by machining operations on the laminations when stacked as indicated in Figure 6, such additional operation is relatively more complicated and expensive than the molding of the slots in powdered iron.

It has heretofore been suggested that an improved performance of stress responsive pickup units may be obtained by subjecting the member to be tested to a magnetic bias to effect a shift of the operating point of the exciting current of the pickup coil to a more linear portion of the magnetic excitation curve, and/or reduce the effect of magnetic hysteresis. Such magnetic bias may be conveniently provided by a separate winding carrying direct or relatively high frequency currents, or, alternatively, by superimposing the biasing current upon the current flowing through the pickup coils. In the event that it is desired to utilize a separate winding for producing such magnetic biasing, such winding should be disposed in the slots 12a or 12b of the construction of Figure 9 in the manner schematically indicated in Figure 14. As shown there, the biasing winding 25 is disposed so as to impart the desired magnetic bias to each of the windings 20a and 20b and yet to avoid any coupling of the two windings 20a and 20b. The plus and minus marks shown on this figure indicate respectively the areas in which the flux flow produced by the biasing winding, for the assumed direction of current flow indicated by the arrows, is into the pole faces and out of the pole faces. It can be readily seen that the bias winding pattern of Figure 14 produces equal plus and minus face areas in each lamination stack, is equally symmetrical to both windings 20a and 20b, and, moreover, has zero coupling to windings 20 and/or 20b, since it produces an equal amount of plus and minus flux areas in each coil or loop of the windings 20a and/or 20b.

While this invention has been particularly described and illustrated in connection with magnetic pickup units employing a pair of axially superimposed windings, it should be clearly understood that the principles thereof are equally applicable to pickup units embodying a single pickup winding or coil and wherein the oriented flux produced by the pickup unit traverses only a portion of the peripheral surface of the shaft to be tested. Since it has been already demonstrated that a pickup unit embodying this invention may be conveniently applied to a wide range of shaft sizes without substantially affecting the impedance of the pickup winding, it is apparent that the application of this invention provides a truly portable, reasonably accurate, instantly applicable torquemeter for any shaft size, only requiring that at least one side of the shaft be exposed.

It will, of course, be understood that various details of construction may be modified through a wide range without departing from the principles of this invention, and it is, therefore, not the purpose to limit the patent granted hereon otherwise than necessitated by the scope of the appended claims.

I claim as my invention:

1. Apparatus for measuring torsional stresses in a circular cross section shaft comprising a pair of substantially identical electrically conducting coils, and magnetic means for supporting said coils adjacent the shaft periphery in axially superposed relation, each of said coils being substantially perpendicular to the other and each of said coils having two sides thereof extending in a generally helical configuration with respect to said shaft, said helically extending sides of one coil being substantially perpendicular to the helically extending sides of the other coil and said helically extending coil sides of one coil also being interlaced with the helically extending coil sides of the other coil where said two coils intersect each other, whereby an equal area portion of each coil is relatively more radially displaced from the surface of said shaft than the remaining portion of each coil.

2. Apparatus for determining stress in a member subjected simultaneously to angularly divergent tensile and compressive stresses comprising a plurality of stacks of magnetic laminations disposed with one end face of each stack adjacent the surface of the member, each of said end faces having two sets of coil slots therein, said sets being respectively substantially parallel to said angularly divergent tensile and compressive stresses in said member, a pair of conducting coils, each conducting coil having opposed sides thereof inserted into one set of said slots, said opposed sides of one coil being interlaced with the opposed sides of the other coil, whereby equal area portions of each coil are displaced relatively further from the surface of said member than the remaining portions of the coil.

3. Apparatus for determining torsional stresses in a shaft comprising a split annular frame arranged to be separated into two semi-circular segments, a plurality of stacks of identical magnetic laminations disposed in spoke-like fashion in each of the two segments and having their inner end faces adjacent said shaft when said segments are secured therearound, said end faces of the laminations having a set of slots therein extending helically with respect to the shaft axis, and a conducting coil disposed in said slots.

4. Apparatus for determining torsional stresses in a shaft comprising a split annular frame arranged to be separated into two semi-annular segments, a plurality of stacks of identical magnetic laminations disposed in spoke-like fashion in each of the two segments and having their inner end faces adjacent said shaft when said segments are secured therearound, said laminations lying in planes parallel to the axis of said shaft, said end faces of the laminations having a first set of slots therein extending helically with respect to the shaft axis, a second set of slots in said end faces extending helically with respect to the shaft axis but perpendicular to the said first set of slots, and a pair of conducting coils respectively disposed in said slots.

5. A torquemeter pickup unit comprising an annular frame, a plurality of identical packs of identical laminations supported by said frame in inwardly projecting, spoke-like relation, spacer members disposed between said lamination packs near the outwardly extending ends thereof, the inner end faces of said packs having a set of helically extending slots therein, a winding inserted in said sets of slots, and a matrix of insulating material bonding said packs near the inwardly extending ends thereof, said winding and said spacers in rigid assembly in said frame.

6. A torquemeter pickup unit comprising an annular frame axially split into two portions, means for clamping said frame portions together to surround a shaft to be tested, a plurality of identical packs of identical laminations supported by each frame portion in inwardly projecting, spoke-like relation, the inner end faces of said packs having a pair of mutually perpendicular, helically extending slots therein, a pair of windings respectively inserted in said slots, and a matrix of insulating material bonding said packs and said windings in rigid assembly in each of said frame portions.

7. A torquemeter pickup unit comprising an annular frame axially split into two portions, means for clamping said frame portions together to surround a shaft to be tested, a plurality of identical packs of identical laminations supported by each frame portion in inwardly projecting, spoke-like relation, the inner end faces of said packs having a helically extending slot therein, a winding inserted in said slot, and a matrix of insulating material bonding said packs and winding in rigid assembly in each of said frame portions.

8. The combination defined in claim 7 wherein said matrix material covers said inner end faces of said stacks and supports the assemblage in bearing relation on a shaft.

9. A magnetic flux pickup unit comprising an elongated block of deformable material capable of being bent lengthwise into an arcuate configuration, a plurality of magnetic pole pieces secured to said block in a longitudinally spaced array, thereby forming a spoke-like array with respect to a test piece when said block is arcuately deformed to at least partially surround the test piece, and a winding associated with said pole pieces and arranged to produce a flux traversing said pole pieces and at least the surface of a surrounded test piece.

10. A magnetic flux pickup unit comprising an elongated deformable frame capable of being bent lengthwise, a plurality of magnetic pole pieces secured to said frame in a longitudinally spaced array, thereby forming a spoke-like array with respect to a test piece when said block is wrapped around the test piece, and a winding associated with said pole pieces and arranged to produce a flux traversing said pole pieces and the surface of a surrounded test piece.

11. The combination defined in claim 10 wherein the pole faces of said pole pieces are helically slotted, and said winding is disposed in said helical slots.

12. The combination defined in claim 10 wherein the pole faces of said pole pieces have two sets of mutually perpendicular, helically extending slots therein, and a pair of windings respectively disposed in said slots.

13. A magnetic flux pickup unit comprising an elongated block of deformable, moldable material capable of being bent lengthwise into an arcuate configuration, a plurality of stacks of magnetic laminations molded in said block in a longitudinally spaced array, thereby forming a spoke-like array with respect to a test piece when said block is arcuately deformed to at least partially surround said test piece, and a winding wound on said pole pieces and arranged to produce a magnetic flux traversing said pole pieces and at least a portion of the surface of the surrounding test piece.

14. A torque meter pickup unit for shafts of a predetermined size range comprising an elongated block of deformable material capable of being bent lengthwise into an arcuate configuration, a plurality of magnetic pole pieces secured to said block in a longitudinally spaced array, thereby forming a spoke-like array with respect to a test piece when said block is arcuately deformed to at least partially surround a shaft, the pole faces of said pole pieces being of generally arcuate configuration of a radius selected substantially equal to the mean radius of the range of shaft sizes, and a winding interwound with said pole pieces and arranged to force flux into the surface of that portion of the shaft lapped by said pole pieces.

15. The combination defined in claim 14 wherein said pole pieces comprise identical stacks of identical laminations.

16. The combination defined in claim 14 wherein said pole pieces comprise identical stacks of identical laminations and said laminations lie in planes parallel to the axis of the shaft.

17. The combination defined in claim 14 wherein said pole pieces comprise identical stacks of identical laminations, the planes of said laminations being substantially parallel to the axis of the surrounded shaft and each lamination being radially displaced with respect to the adjacent lamination of the stack to provide said generally arcuate pole face configuration.

18. The method of assembling a magnetic pickup unit which comprises forming a plurality of identical stacks of magnetic laminations, supporting said stacks in spaced alignment with the end faces thereof exposed, forming a winding separately from said stacks, applying the formed winding to said stacks, and forming the wound stacks into a generally annular segment array with said stacks disposed in spoke-like relation therein.

19. The method of assembling a magnetic pickup unit for torquemeters which comprises forming a plurality of identical stacks of magnetic laminations, cutting slots in said exposed end faces, suppporting said stacks in spaced alignment with the slotted end faces thereof exposed, forming a winding separately from said stacks inserting the formed winding into said slots, and forming the wound stack into a generally annular segment array with said stacks disposed in spoke-like relation therein.

20. The method of assembling a magnetic pickup unit which comprises forming a plurality of identical stacks of identical magnetic laminations, forming two sets of slots in said exposed end faces, said sets being mutually perpendicular and angularly disposed relative to the laminations, supporting said stacks in spaced alignment with the slotted end faces thereof exposed, forming a pair of windings of trapezoidal configuration, interlacing said windings so that two parallel coil sides in one winding are perpendicular to the two parallel coil sides of the other winding and equal bounded area portions of each winding are respectively above and below the other winding, inserting said parallel coil sides of said inerlaced windings respectively in said sets of slots, and forming the wound stacks into a generally annular segment array with said stacks disposed in spoke-like relation therein.

21. Apparatus for determining torsional stresses in a shaft comprising a split annular frame arranged to be separated into two semi-annular segments, and a plurality of stacks of identical magnetic laminations disposed in spoke-like fashion in each of the segments and having their inner end faces adjacent said shaft when said segments are secured therearound, said end faces of the laminations having a first set of slots therein extending helically with respect to the shaft axis, a second set of slots in said end faces extending helically with respect to the shaft axis but angularly displaced from said first set of slots, a first current conducting winding traversing said first set of slots and aranged to produce a magneto-motive force along the general direction of the tension component of torsional stress in the surface of the shaft and a second current conducting winding traversing said second set of slots and arranged to produce a magneto-motive force along the general direction of the compressive component of torsional stress in the surface of the shaft whereby the effective impedances of said coils vary differentially by application of torsional stresses to said shaft.

22. A torquemeter pickup unit comprising an annular frame, a plurality of identical packs of laminations supported by said frame in inwardly projecting, spoke-like relation, the inner end faces of said packs having a helical slot therein, a winding inserted in said slot and a matrix of insulating material bonding said packs and said windings in rigid assembly in said frame, said matrix material covering said inner end faces of said stacks and supporting the assemblage in bearing relation on a shaft.

23. Apparatus for determining torsional stresses in a shaft-like member comprising a plurality of stacks of magnetic laminations disposed in spoke-like fashion adjacent said shaft-like member, the inner end faces of each stack having two sets of coil slots therein, said sets being mutually perpendicular and extending helically with respect to the axis of said shaft-like member, a pair of conducting coils respectively inserted in said sets of slots, and a biasing winding traversing both sets of coil slots, said biasing winding being arranged to cause a pre-loading flux threading each of said coils but producing substantially no coupling between said coils.

KENNETH W. MILLER.

References Cited in the file of this patent

UNITED STATES PATENTS

| Number | Name | Date |
|---|---|---|
| 1,606,755 | Field | Nov. 16, 1926 |
| 1,934,766 | Krussmann | Nov. 14, 1933 |
| 1,952,917 | Granfield | Mar. 27, 1934 |
| 2,053,560 | Janovsky | Sept. 8, 1936 |
| 2,337,231 | Cloud | Dec. 21, 1943 |
| 2,365,073 | Haight | Dec. 12, 1944 |
| 2,431,260 | Langer | Nov. 18, 1947 |
| 2,553,833 | Rifenbergh | May 22, 1951 |

FOREIGN PATENTS

| Number | Country | Date |
|---|---|---|
| 49,262 | France | Nov. 12, 1938 |
| 442,441 | Great Britain | Feb. 3, 1936 |
| 831,342 | France | June 7, 1938 |